United States Patent [19]

Gregoire et al.

[11] 4,351,059

[45] Sep. 21, 1982

[54] METHOD FOR TESTING A DIGITAL DATA TRANSMISSION LINE BETWEEN TWO MODEMS AND A DEVICE FOR THE APPLICATION OF SAID METHOD

[75] Inventors: Michel Gregoire; Jean C. Vuillemin, both of Conflans Ste Honorine, France

[73] Assignee: Lignes Telegraphiques et Telephoniques, Conflans Ste Honorine, France

[21] Appl. No.: 187,771

[22] Filed: Sep. 16, 1980

[30] Foreign Application Priority Data

Sep. 18, 1979 [FR] France .................................. 79 23241

[51] Int. Cl.³ .......................... H04L 1/14; H04L 1/16; H04B 3/46
[52] U.S. Cl. .............................. 375/10; 179/175.2 R; 371/22; 371/27; 371/34
[58] Field of Search ....................... 370/13, 14, 15, 17, 370/24; 371/15, 22, 24, 27, 34, 35; 375/7, 8, 9, 10; 455/67, 226; 179/175, 175.2 R, 175.2 D, 175.3 R

[56] References Cited

U.S. PATENT DOCUMENTS

| | | | |
|---|---|---|---|
| 3,824,548 | 7/1974 | Sullivan et al. | 370/17 |
| 3,934,224 | 1/1976 | Dulaney et al. | 375/10 |
| 4,034,195 | 7/1977 | Bates | 371/22 |

FOREIGN PATENT DOCUMENTS

| | | | |
|---|---|---|---|
| 2317829 | 2/1977 | France . | |
| 720740 | 3/1980 | U.S.S.R. | 375/10 |

*Primary Examiner*—Benedict V. Safourek
*Attorney, Agent, or Firm*—Oblon, Fisher, Spivak, McClelland & Maier

[57] ABSTRACT

A method for testing a digital data transmission line connected between two modems, including the steps of transmitting a test message from the first modem to the second modem, comparing the received message with the standard test message to determine errors, transmitting a test message back to the first modem along with the error message determined from comparing the received test message with the standard test message at the first modem. The error signal transmitted to the first modem and the error detected there is interpreted to determine the error in the transmission.

12 Claims, 17 Drawing Figures

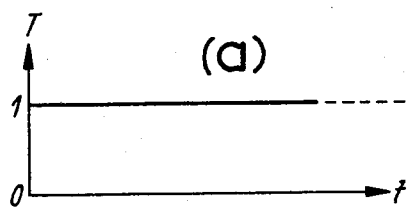
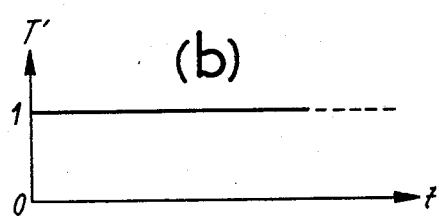
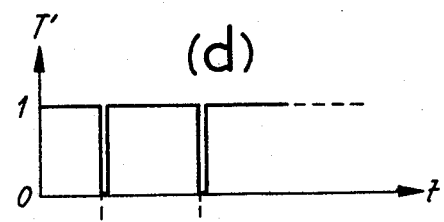
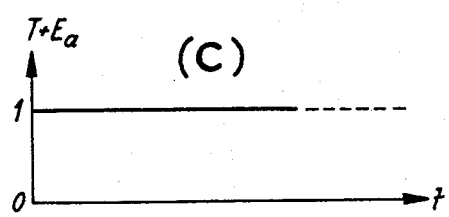
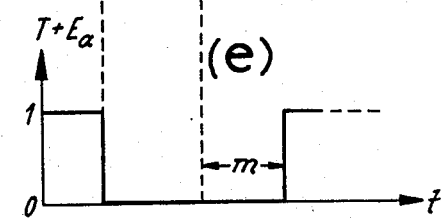
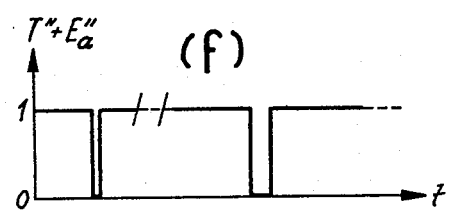
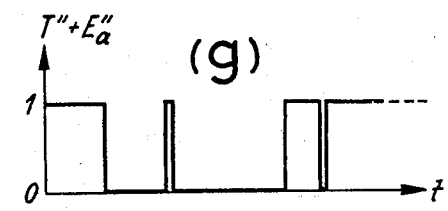
FIG. 4

METHOD FOR TESTING A DIGITAL DATA TRANSMISSION LINE BETWEEN TWO MODEMS AND A DEVICE FOR THE APPLICATION OF SAID METHOD

This invention relates to the field of digital data communications and is more particularly directed to a method of automatic testing of a data transmission line connected between two or a number of modems. The invention is also directed to a device for the practical application of said method.

When it is desired to carry out remote data processing, a known practice consists in connecting a central data-processing unit to one or a number of peripheral elements for acquisition and visual display of said data for example, via a transmission channel such as a telephone line. As is already known, digital data modulator-demodulator devices or modems are in that case employed as interfaces between the data transmission channel and the units for processing these data, at each end of the line.

In regard to the maintenance of systems of this type, the low relative cost of modems compared with data processing systems proper presents a problem of economic character for manufacturers of modems. In the first place, the interests of users have to be considered since any failure of a connection is attended by outage of costly equipment, with the result that users desire rapid servicing. In the second place, modem manufacturers must in turn give due consideration to the fact that rapid servicing operations for the purpose of inspecting connections represent a heavy financial burden in comparison with the cost of manufactured equipment.

Known testing systems of different types which tend to solve this difficulty have been employed up to the present time. Among these can be mentioned the error generator and counter which is separate and distinct from the modem. This device is connected to the modem and serves to transmit a predetermined sequence of signals via the connection; this sequence is either analyzed at the other end of the line by a second device for generating and counting errors or returned via the same line by the modem which is located at the other end of the line and connected as a feedback loop. This solution is subject to a number of different disadvantages, especially the cost of the testing equipment which is distinct from the modem, the lack of accuracy of the error diagnostic when only one testing device is employed, and the need to have two qualified operators and two testing devices when the source of the error has to be located with greater accuracy.

The present invention is directed to a method and a device for automatic testing of a connection between two or more modems, irrespective of the mode of operation of the connection. Devices of this type can be integrated with the modems themselves and the test is initiated by a single control element at either end of the connection without any manual operation at the other end.

In more precise terms, the method of testing in accordance with the invention primarily involves the following steps:

transmission of a predefined test message T from a first modem selected as a starting-point of the test to a second modem located at one of the other ends of the connection to be tested;

reception of said message by the end modem;

comparison of the message received with the message T from which are deduced any possible transmission errors in the direction considered from the starting-point modem to the end modem, or so-called forward-transmission errors;

transmission by the end modem of a message which is identical with the message T and accompanied by a second message containing the indication of the forward-transmission errors;

reception of the two messages by the starting-point modem;

comparison of the messages received with the message T, thus providing an indication of any possible transmission errors in the direction considered from the end modem to the starting-point modem, or so-called return-transmission errors;

deduction of any possible forward-transmission errors from the forward-transmission error message received.

The invention is also directed to a device for carrying out the method aforesaid.

Other features of the invention will become apparent upon consideration of the following description and accompanying drawings, wherein:

FIG. 4a–FIG. 4g show a number of diagrams of signals which can be applied to the device according to the invention or produced by said device in a second mode of operation of the connection;

In these different figures, the same reference numerals relate to the same elements.

Figure 1:
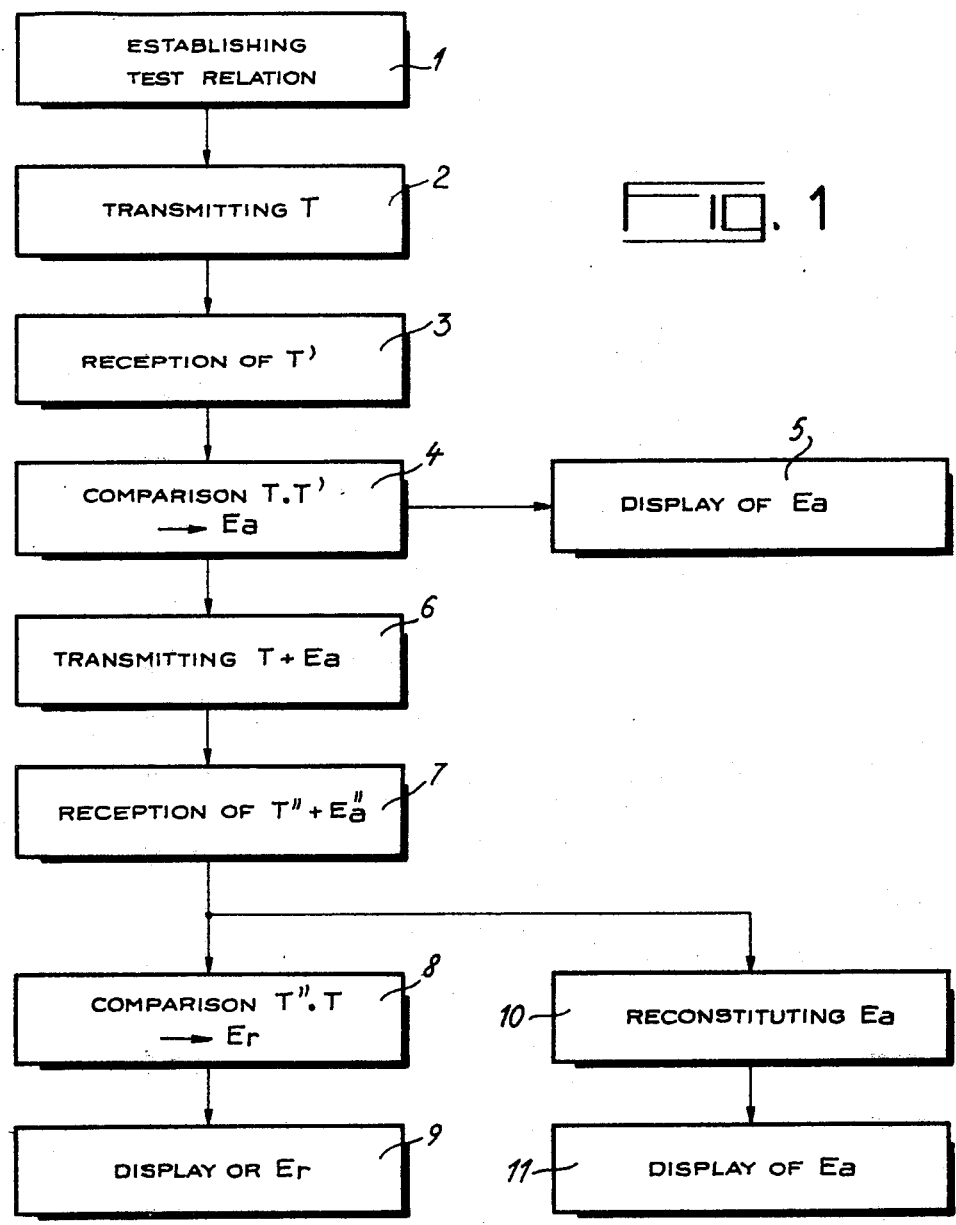
FIG. 1 is a schematic diagram of the method according to the invention for making a connection test.

FIG. 1 therefore illustrates the method according to the invention for testing a connection between two modems in which one modem, for example, is connected to a central data-processing unit whilst the other modem is connected to one of the peripheral elements of the system in which provision may be made for a plurality of such elements.

The first step of the method is a preliminary step for establishing a relation between the two modems involved by means of the connection to be tested, as represented by a block 1 in the figure. This relation is established in accordance with any procedure which is specific to the modems employed. A preferred mode of execution of these procedures is described below (with reference to FIG. 5).

The first step of the testing method proper is carried out immediately after the above-mentioned relation establishment operation and is illustrated in the figure in the form of a block 2. This step consists in transmitting a predefined message designated as T from one of the modems chosen as a starting-point modem (that is, the modem from which the test is initiated and on which the results of this test will be displayed) to the other modem designated as the end modem. It should be noted that the modems located at the two ends of the connection are preferably identical and that either of these two modems may consequently be employed as the starting-point modem.

The following step designated by the reference numeral 3 in the figure consists of reception of the message T by the end modem; this received message is designated by the reference T' and is either identical or not identical with T, depending on whether the transmission has taken place with or without error.

In the following step designated by the reference numeral 4 in the figure, the end modem makes a comparison between the message T' which it has received and the message T which has been transmitted. The modem deduces therefrom either the existence or the non-existence of one or a number of transmission errors in the direction considered from starting-point modem to end modem, such errors being designated as forward-transmission errors. This information is designated by the reference $E_a$.

In one embodiment, said information $E_a$ is displayed on the end modem (step 5).

At the same time as this display, the end modem transmits to the starting-point modem a message containing the message T aforesaid and accompanied by a message representing the error $E_a$ (step 6).

The following step designated in the figure by the reference numeral 7 is the reception by the starting-point modem of the message transmitted during the preceding step, the message received being designated by the reference $T'' + E''_a$. This message is processed in two ways:

on the one hand (step 8 in the figure), the starting-point modem makes a comparison between the message T'' received and the message T, then deduces therefrom (as was previously the case with the end modem in step 4) either the existence or the non-existence of transmission errors in the direction considered from end modem to starting-point modem; this information which is designated as the return-transmission error is given the notation $E_r$ and displayed on the starting-point modem: this is the step designated by the reference numeral 9 in the figure;

on the other hand (block 10 in the figure), the starting-point modem must make an interpretation of the message $E_a''$ received since this latter is liable to be erroneous, with a view to reconstituting the initial message $E_a$ which is then displayed (block 11 in the figure) on the starting-point modem.

It is thus apparent that the entire testing operation is initiated by the starting-point modem without any manual operation at the level of the end modem and that all items of information (forward-transmission errors and return-transmission errors) are displayed at the level of the starting-point modem.

Figure 2:
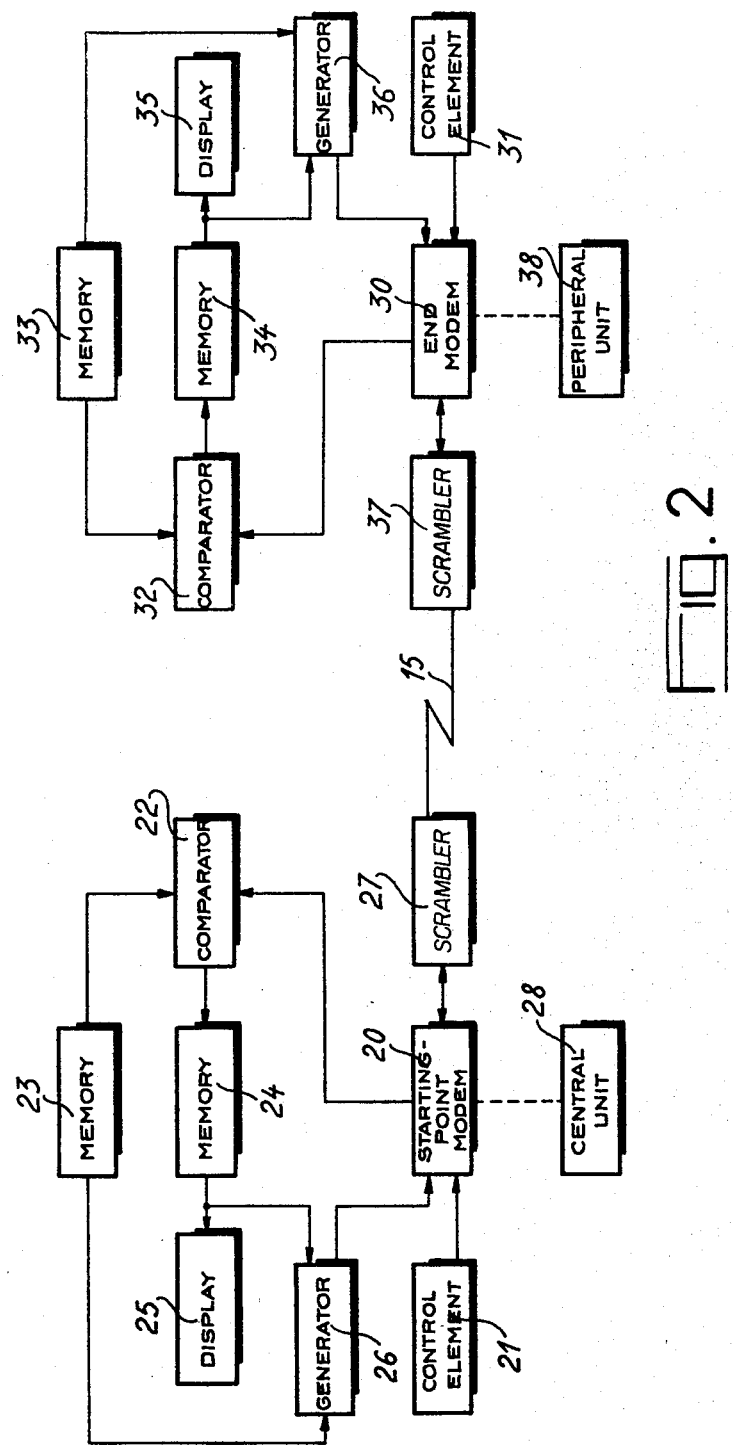
FIG. 2 is a diagram of one embodiment of the device according to the invention.

The method hereinabove described can be carried into effect by any suitable means. By way of example, FIG. 2 is a schematic illustration of one embodiment of a device in accordance with the invention for carrying out this test method.

The device aforesaid comprises two modulator-demodulator systems for digital data (modems) designated in the figure by the references 20 and 30 and connected together by a data transmission channel 15 constituted by a telephone line, for example. One of these modems such as, for example, the modem 20, is connected to a central data processing unit 28; the other modem 30 is connected to one of the peripheral units 38, for example (such as data acquisition or visual display units) which is intended for dialog with the central unit 28.

A group of electronic circuits is associated with each modem. Thus circuits 21 to 27 are associated with the modem 20 and circuits 31 to 37 are associated with the modem 30. These circuits serve to carry out the method described earlier.

One of these two modems is chosen as the starting-point modem which can be either the modem 20 connected to the central unit or the modem 30 connected to a peripheral unit. In the following description, it will be assumed by way of example that the modem 20 is chosen as the starting-point.

A control element 21 connected to the modem 20 serves to establish a relation between this latter and another modem of the network, in this case the modem 30. This control element 21 carries out the preliminary step 1 of FIG. 1.

A generator 26 is also connected to the modem 20 and has the function of producing the signals which are necessary for the testing operation. The signal concerned in the case of the starting-point modem 20 and in the case of step 2 of the method of FIG. 1 is the signal T. The waveform of the signal T is predefined and contained in a memory element 23 which delivers said waveform to the generator 26.

In a preferred embodiment as shown in the figure, the output of the modem 20 is connected to a scrambler-descrambler device 27 of the pseudo-random type which has the function of scrambling in known manner the signal T delivered by the modem and to which corresponds a self-synchronizable scrambler-descrambler device 37 placed at the other end of the line 15 before the end modem 30. In accordance with known practice, the insertion of scrambler in the device in fact makes it possible to employ test messages which are simple both to generate and to recognize without consequently experiencing unduly favorable conditions of transmission.

In order to carry out step 4 of the method of FIG. 1, the end modem 30 is connected to a comparator 32 which effects the comparison of the signal T' received with the signal T which is delivered thereto by a memory 33 which is similar to the aforementioned memory 23. The forward-transmission error information $E_a$ is deduced from this comparison. This information is delivered to an element 34 like a memory, furnishing a sufficiently redundant message which represents the forward-transmission error $E_a$ and can consist, for example, of a sequence of bits having the same value. This message is transmitted on the one hand to a display device 35 and on the other hand to a generator 36 which is similar to the generator 26 and connected to the modem 30. Furthermore, the generator 36 is connected to the memory 33 in order to ensure transmission of a message representing both the signal T and the forward-transmission information $E_a$.

The step 6 of the method of FIG. 1 is then carried out via the scrambler-descrambler 37 and 27 and the line 15.

Step 8 of the method shown in FIG. 1 is carried out by an element 22 which is similar to the element 32 and receives the return-transmission message $T'' + E''_a$. To this end, said element 22 makes the comparison $T - T''$, which provides an indication of any possible errors in the return direction to an element 24 which is similar to a preceding element 34. Said element 24 generates a signal $E_r$ representing the return-transmission error and transmits said signal to a display device 25.

Furthermore, the element 22 carries out step 10 which involves recognition of the signal $E_a$ by means of the received signal $E_a''$. In the case in which the signal $E_a$ is a sequence of bits having the same value, signal recognition is performed by counting bits having the value representing an error: when the number obtained is higher than a predetermined threshold value, the existence of a forward-transmission error is recognized. On the contrary, when said number is below the threshold value, the forward-transmission error is considered as zero, only the message $E_a$ being erroneous in its transmission from the end modem to the starting-point modem (direction of return transmission). The information resulting from recognition of the signal $E_a$ is transmitted to the element 24, then to the display device 25.

As stated earlier, and in order to ensure that the modems are interchangeable and that the test can be initiated indifferently at either end of a line, said modems must necessarily be identical. With this objective, the circuits 21 to 27 connected to the modem 20 are identical with the corresponding circuits 31 to 37 of the modem 30 or at least ensure the same functions in a compatible manner.

Figure 3:
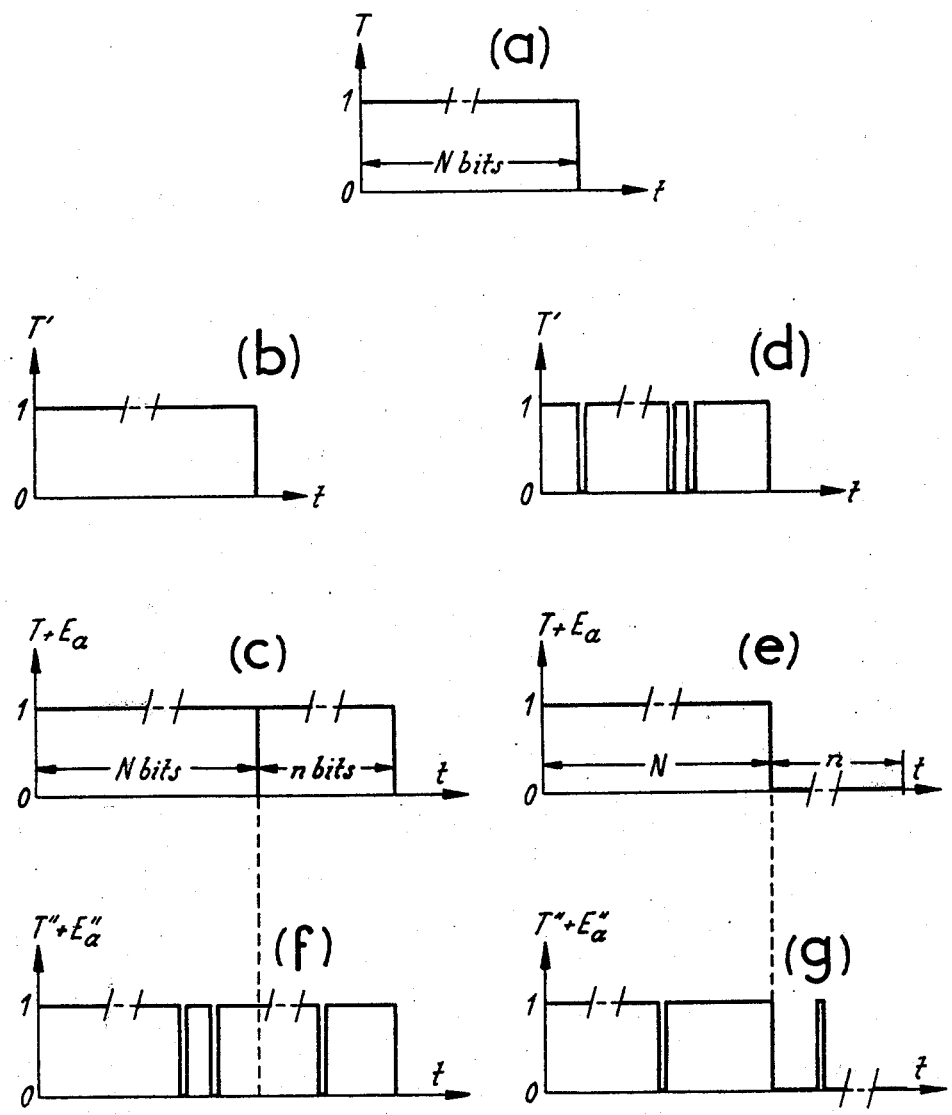
FIG. 3a–FIG. 3g show a number of diagrams of signals which can be applied to the device according to the invention or produced by said device in a first mode of operation of the connection.

FIG. 3 and FIG. 4 are diagrams of signals applied to the aforementioned device or delivered by this latter according to the operating mode of the connection. Thus FIG. 3 represents the signals corresponding to a so-called alternate, half-duplex or semi-duplex operation, or in other words an operating mode in which the modems utilize the transmission line 15 one after the other whilst FIG. 4 corresponds to a so-called full-duplex operating mode in which the modems can utilize the line 15 at the same time; this is made possible either by assigning different frequency bands to the data according to their direction of flow or by doubling of electrical connections.

FIG. 3a–FIG. 3g therefore show the signals employed in half-duplex operation.

Diagram 3a represents the signal T constituted, for example, by a sequence of N bits at the value 1.

Diagram 3b represents the signal T' received by the modem 30 when the connection is correct, in which case T' is identical with T.

Diagram 3c represents the message returned by the modem 30. This message contains the aforesaid signal T, that is to say N bits having the value 1, to which is added one signal out of n bits representing the error $E_a$. When there is no forward-transmission error as in the case of diagram 3b, this information is represented by n bits equal to 1. The modem 30 therefore delivers N+n bits equal to 1.

When the connection is faulty, the signal T' received by the end modem 30 has a waveform which is close to the waveform shown in FIG. 3d. In other words, the received signal contains a certain number (a) of bits equal to zero.

In this case, the message returned by the end modem 30 (diagram 3e) also has two portions: the first portion is always the signal T, namely N bits equal to 1, but the second portion which indicates the forward-transmission error is constituted by n bits equal to zero.

In the return direction from the end modem to the starting-point modem, and when the connection is correct, the received signal $T''+E_a''$ is identical with the transmitted signal $T+E_a$. In the case of FIG. 3c, the starting-point modem receives the signal T in an identical manner, the element 22 deduces from this latter that the return error is zero, then receives n bits which are all equal to 1 and deduces therefrom that the forward-transmission error is also zero. In the case of FIG. 3e, the element 22 receives the n last bits which are all equal to zero and deduces from this latter that the forward-transmission error is not zero.

When the return transmission is faulty, the starting-point modem 20 receives either a signal illustrated in FIG. 3f in the event that the transmitted signal is the signal of FIG. 3c, or a signal illustrated in FIG. 3g in the event that the transmitted signal is the signal shown in FIG. 3e. As mentioned earlier, a comparison of the N first bits with T provides an indication of the return-transmission error $E_r$ which is equal to 1 in both cases. In regard to the forward-transmission error, the element 22 counts the number of bits b which are in the zero state. If this number b is smaller than n/2, it is decided that the forward-transmission error is zero; on the contrary, if b is greater than n/2, the forward-transmission error is considered as different from zero.

FIG. 4a–FIG. 4g show the signal in the case of full-duplex operation.

FIG. 4a represents the signal T: the difference with respect to FIG. 3a lies in the fact that the signal T is no longer limited to N bits but is continuous throughout the duration of the test.

Similarly, FIG. 4b represents the signal T' which is received by the end modem when the transmission is correct and which is therefore identical with the signal T.

FIG. 4c represents the message $T+E_a$ transmitted by the end modem to the starting-point modem. In a manner which is similar to the foregoing description with reference to half-duplex transmission, the message $T+E_a$ corresponding to a zero forward-transmission error is a sequence of bits equal to 1, this sequence being continuous in this case.

The diagram of FIG. 4d represents the signal T' received by the end modem when the transmission is incorrect in the forward direction: with respect to the signal T, this transmission contains a certain number of errors or, in other words, of bits equal to zero.

FIG. 4e represents the message $T+E_a$ which is transmitted in the last-mentioned case by the end modem to the starting-point modem. The message is equal to 1 at the outset, then passes to the zero level at the time of detection of the first erroneous bit, then remains at the zero level during m bits, starting from the last error detected.

As in the case of half-duplex operation, and when the return connection is not disturbed, the signals received by the starting-point modem are identical with the signals emitted by the end modem and are not shown.

The diagram of FIG. 4f represents the message $T''+E_a''$ received by the starting-point modem when the end modem has transmitted the signal $T+E_a$ of FIG. 4c and when the transmission is faulty. As in the case of the aforementioned FIG. 4d, the poor quality of the connection is represented by erroneous bit equal to zero.

In FIG. 4g, which corresponds on the contrary to faulty transmission of the message $T+E_a$ of FIG. 4e, the errors are represented by bits equal to 1 when these errors occur within the interval of the m bits representing the forward-transmission error $E_a$.

Interpretation of errors is effected as follows and in much the same manner as the procedure described earlier. Thus the starting-point modem counts the number c of bits equal to zero; when this number c is smaller than m/2, it is accordingly deduced that the error involved is a return-transmission error. On the other hand, when the number c is larger than m/2, there is accordingly deduced the existence of an error on the forward-transmission channel.

By way of example, N, n and m are of the same order of magnitude, namely in the vicinity of 50 bits.

Figure 5:
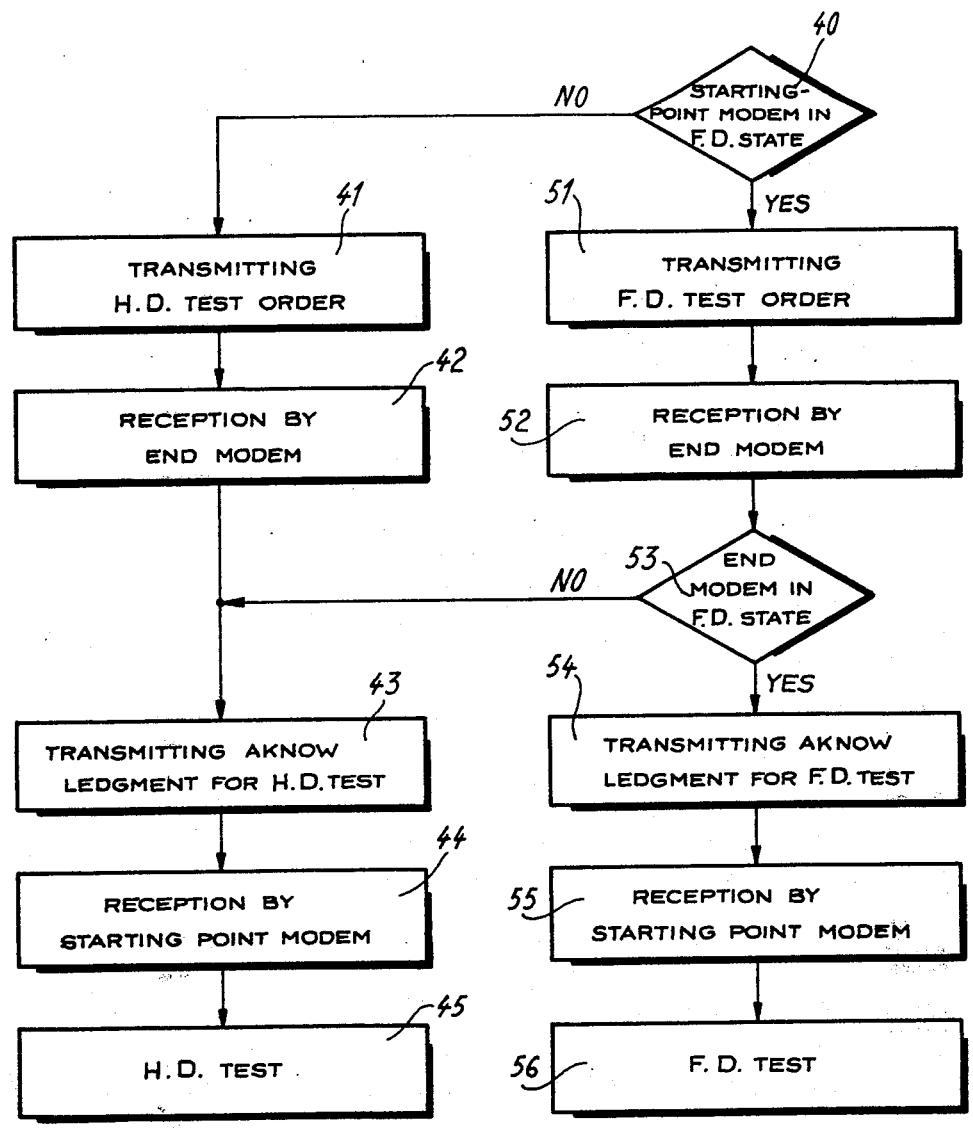
FIG. 5 shows a detail of one of the steps of the method illustrated in FIG. 1.

FIG. 5 shows one mode of execution of the preliminary step (1) of the method described with reference to FIG. 1, said step being carried out by means of the control elements 21 and 31 of the modems 20 and 30 of FIG. 2.

The intended function of this step is not only to establish a relation between the two modems involved for testing purposes but to effect an automatic selection of the mode of connection in which the test is to take place, that is to say for either half-duplex or full-duplex operation. In fact, in the preliminary step as in the remainder of the method, the same principle is adopted, namely the control of all functions by a single modem selected as a starting-point. On the other hand, especially in the case of a multipoint network, the two modems concerned may not be in the same operating state: it frequently happens that the modem which is connected to the central unit operates in the full-duplex state whereas a certain number of modems which are connected to the peripheral units operate in the half-duplex state. In the last-mentioned case, the test procedure must take place in half-duplex operation.

The first step of the method described in FIG. 5 is a starting-point modem test (step 40) for determining whether this modem is in the full-duplex transmission state or not.

If the starting-point modem is in the full-duplex state, said modem then transmits a "full duplex" test order to the end modem concerned (step 51).

As will readily be apparent, the waveform of the order can be of any type desired for the method described and depends on the exchange procedures adopted. In a preferred embodiment, said order is composed of three portions: the first portion on t bits constitutes an identification message and can be constituted by a sequence of identical t bits; the second portion is constituted by the address of the end modem concerned on u bits; and finally the third portion on v bits characterizes the order concerned, namely a "full duplex" test order in the case under consideration.

Moreover, in regard to the channel selected for transmission of the test orders, this channel can be either the frequency band employed for the data themselves or a different band. In the last-mentioned case, this band is preferably located at the bottom of the passband of the modems and exchanges of data take place at a very low rate of the order of ten Bauds in order to ensure that a faulty connection causes minimum interference with test information.

The following step (block 52) is constituted by the reception of the preceding order by the end modem.

The following step (53) is a test which applies to the state of operation (full-duplex or half-duplex state) of the end modem.

If the end moden is in the full-duplex state, the following step (54) consists in transmission by the end modem of an aknowledgment for informing the starting-point modem that the end modem is ready for a test in full-duplex operation.

In a preferred embodiment, the waveform of the aknowledgment is identical in this case to the waveform of the order signal described earlier, only the address of the modem concerned being replaced by the address of the starting-point modem.

The following step (55) consists in the reception of the aknowledgment by the starting-point modem.

This procedure terminates in a block 56 which provides a general illustration of the test in full-duplex transmission as described in FIGS. 1, 2 and 4.

If the first test (40) of said method is now resumed, it is apparent that when the starting-point modem is not in the full-duplex state, said modem then transmits a half-duplex test order (step 41).

This order signal preferably has the same waveform as the order signal described earlier, only the last portion being modified in order to request a half-duplex test.

The procedure continues with the reception of the order by the end modem (step 42).

In this case, irrespective of the state of the end modem (half-duplex or full-duplex state), this latter transmits an aknowledgment for a half-duplex test: this is the step 43 shown in the figure. The waveform of this aknowledgment is preferably the same as the waveform of the order signal of step 41, subject to a change of address.

The following step (44) is the reception of said aknowledgment by the starting-point modem and the end of the procedure (45) consists in resuming the method of FIG. 1 in step 2.

If the second test (53) mentioned earlier is now resumed, when the end modem is not in full-duplex operation, the second procedure described above is carried out between the steps 42 and 43; in other words, the end modem then transmits an aknowledgment for a half-duplex test.

The application of the methods and of the device described in the foregoing therefore makes it possible to check the correct operation of a connection between two modems starting from either of these latter. This is the case in the event either of a point-to-point connection comprising only one central unit and one peripheral unit or of a particular branch of a multipoint connection.

Moreover, the foregoing description has been given solely by way of example and not in any limiting sense. From this it accordingly follows in particular that the waveforms of the signals T and $E_a$ described earlier can be replaced by any other readily identifiable waveforms.

What is claimed is:

1. A method of testing a line for the transmission of digital data between two modems, wherein said method comprises the following steps:

transmission of a predefined test message from the first modem selected as a starting-point of the test to the second modem located at the other end of the line to be tested;

reception of said predefined test message by the end modem;

comparison of the message received with the test message for determining information representing the existence or non-existence of transmission errors in the direction considered from starting-point modem to end modem or so-called forward-transmission error information;

transmission by the end modem of the test message and of a second message containing the forward-transmission error information;

reception of the two messages by the starting-point modem;

comparison of the received test message with the test message itself, thus providing information representing the existence or non-existence of transmission errors in the direction considered from end modem to starting-point modem or so-called return-transmission error information;

recognition of the forward-transmission error information starting from that portion of the messages received which corresponds to the second message.

2. A method according to claim 1, wherein the test message is constituted by a sequence of bits having the same value.

3. A method according to claim 1, wherein the second message containing the forward-transmission error information is constituted by a sequence of bits having the same value.

4. A method according to claim 2, wherein the bits constituting the test message and the bits constituting the second message have the same value when no forward-transmission errors are present.

5. A method according to claim 4, wherein the bits constituting the test message and the bits constituting the second message are in predetermined numbers and have opposite values when a forward-transmission error has been detected.

6. A method according to claim 4, wherein the test message is constituted by a sequence of bits which is continuous throughout the duration of the test and wherein, when a forward-transmission error is detected, the second message is constituted by a predetermined number of bits having a value opposite to those constituting the test message.

7. A method according to claim 5 or claim 6, wherein the step involving recognition of the forward-transmission error information is performed by counting the number of error-indicating bits received by the starting-point modem and comparing said number with a predefined threshold value.

8. A method according to claim 7, wherein said threshold value is equal to one-half the number of bits constituting the second message and wherein the reception of bits greater in number than said threshold value and having a value opposite to the value selected for the test bits indicates the existence of forward-transmission errors.

9. A method according to claim 1, wherein said method further involves a preliminary step for determining the mode of transmission of information relating to the test, comprising the following steps:

a test for the half-duplex state or full-duplex state of the starting-point modem;

transmission by the starting-point modem of a test order in the half-duplex mode or full-duplex mode respectively;

reception of the order by the end modem and testing of its intrinsic state;

transmission of a clearing signal by the end modem for initiating a test in full-duplex operation only in the event that both modems are in this state.

10. A method according to claim 9, wherein the test orders are composed of three portions each containing a predetermined number of bits, one portion being employed for identification of a test order, a second portion being employed for providing the address of the end modem and a third portion being employed for defining the order considered.

11. A method according to claim 1, wherein the items of information relating to the test are transmitted via a channel which is separate and distinct from the channel employed for data transmission.

12. A device for testing a digital data transmission line connected between two modems wherein said device comprises:

means for transmitting a predefined test message from the first modem selected as a starting-point of the test to the second modem located at the other end of the line to be tested;

means for receiving said predefined test message by the end modem;

means for comparing the message received with the test message and for determining information representing the existence or non-existence of transmission errors in the direction considered from starting-point modem to end modem or so-called forward-transmission error information;

means for transmitting by the end modem of the test message and of a second message containing the forward-transmission error information;

means for receiving the two messages by the starting-point modem;

means for comparing the received test message with the test message itself, thus providing information representing the existence or non-existence of transmission errors in the direction considered from end modem to starting-point modem or so-called return-transmission error information;

means for recognizing the forward-transmission error information starting from that portion of the messages received which corresponds to the second message; and two groups of circuits connected respectively to each modem, wherein each group comprises at least:

means for comparing a signal received by the modem to which it is connected with a reference signal for delivering an error information on the transmission of data in a first direction;

counting means for performing recognition of a message representing the error information on the transmission of data in the second direction.

* * * * *